UNITED STATES PATENT OFFICE.

JULIA HALE, OF CRANFORD, NEW JERSEY, EXECUTRIX OF RICHARD HALE, DECEASED.

PYROXYLINE VARNISH.

SPECIFICATION forming part of Letters Patent No. 471,422, dated March 22, 1892.

Application filed August 13, 1887. Serial No. 246,852. (No specimens.) Patented in England April 16, 1887, No. 5,586, and April 20, 1887, No. 5,791; in France June 30, 1887, No. 184,548; in Belgium September 17, 1887, No. 78,913, and in Austria-Hungary September 20, 1889, No. 17,684.

*To all whom it may concern:*

Be it known that RICHARD HALE, deceased, late a citizen of the United States, residing at Cranford, Union county New Jersey, did in his lifetime invent certain new and useful improvements in protecting metal surfaces and in pyroxyline solutions or varnishes for use therein and for other purposes, (for which Letters Patent have been obtained in Austria-Hungary, No. 17,684, dated September 20, 1889; in France, No. 184,548, dated June 30, 1887; in Belgium, No. 78,913, dated September 17, 1887, and in Great Britain, No. 5,586, dated April 16, 1887, and No. 5,791, dated April 20, 1887,) of which the following specification is a full, clear, and exact description.

This invention has for its object more particularly to protect polished metal surfaces with pyroxyline films by means of thin solutions of pyroxyline, or, in other words, by means of pyroxyline solutions, which can be applied to the surface by dipping, brushing, or the like, after the manner of a varnish or lacquer.

Heretofore thin solutions of pyroxyline have been made and it has been proposed to employ them, or at least some of them, upon metal surfaces; but the application has not been practically successful, the film produced by the use of these known solutions in accordance with any known process lacking one or more of those qualities or characteristics which are necessary to an industrial result. Thus, for example, the films so produced would be, or would be apt to be, first, uneven—*i. e.*, of such variable thickness as to be objectionable—or, second, soft as compared with the coatings left by resin spirit varnishes, especially those of the better class, or, third, covered with small wrinkles, or, fourth, pervious to air and moisture, or, fifth, cloudy or opaque, or, sixth, unsubstantial, showing rainbow colors, or, seventh, not adherent in places over the whole surface, or, eighth, without sufficient cohesion. Irrespective, however, of the inferiority of the product, all or many of the solutions would be unsuited to industrial uses, owing either to the loss of solvent by excessive volatilization or to the long time consumed in drying, or even to both causes or to the parting of ingredients.

By the present invention the difficulties before experienced have been avoided and a new industrial result attained—that is to say, metal surfaces, polished or otherwise, can with facility and certainty be coated with an even, hard, thin, smooth, impervious, transparent, and substantial film of pyroxyline of sufficient tenacity, adhesion, and durability practically to resist the handling and exposure to which lacquered articles in general are subjected.

The invention comprises these articles (especially those with polished metal surfaces) coated with such films as a new manufacture; also, the new or improved means (processes and solutions) hereinafter described, as used in their production. One of the most import of these means consists in applying to the metal surface by dipping, brushing, or the like a thin neutral solution of pyroxyline in a menstruum of medium volatility so prepared and used as to be practically free from water during the application of the solution and the drying of the adherent film. By a thin solution is meant one having a consistency suited to a varnish or lacquer, as before stated. By a neutral solution is to be understood one free from acid or other ingredient which will corrode the metal. By "menstruum of medium volatility" is to be understood one which when exposed in a film at or slightly above atmospheric temperatures will evaporate, not so rapidly as to prevent the formation of an even coating, but yet in a reasonable time, leaving a smooth or unwrinkled substantial coating.

By practically free from water is to be understood sufficiently free from moisture to avoid its characteristic cloudy effect. Such effect and the attendant loss of coherence and adhesive power RICHARD HALE, it is believed, first discovered was due to the presence of moisture in the film, either originally or by absorption from the air in drying. Of this fact he availed himself in the production of thin neutral solutions of medium volatility whose use should not be attended by these injurious results. For the production of such solutions it is of course necessary for the menstruum to have a certain solvent power in order to retain in solution sufficient pyroxyline to form a substantial coating, and to secure the requisite solvent power the menstruum must contain a certain proportion of a solvent liquid or liquids.

To secure a neutral solution it necessary to employ neutral liquids. The employment of acetic acid, which is one of the known solvents of pyroxyline, is therefore excluded, since it corrodes metal surfaces.

To produce a solution of medium volatility, the use of non-volatile liquids (fixed oil, for example) is excluded, and to a certain extent the use, also, of very volatile liquids, like ethyl ether (otherwise known as sulphuric ether) or of slowly-volatile liquids, like most of the essential oils—say nitro-benzine, (otherwise oil of mirbane,) oil of camphor, or oil of cedar, for example. In other words, non-volatile liquids, which would prevent the pyroxyline film from becoming hard and adherent, are not to be used. Liquids of very high volatility, if used at all, are to be employed to such a limited extent that they do not prevent the formation of a practicably even film nor interfere with industrial working, and liquids of very low volatility, if used at all, are to be employed to such a limited extent that they do not unreasonably prolong the time of drying nor cause the production of an unsubstantial or a wrinkled film. The unsubstantial film (indicated by the appearance of rainbow colors) results from the use of a slowly-drying free-flowing solution by too much of the solution draining off. The formation of a wrinkled film has practically been found to be a result of the presence in the applied film in large proportion of those slow-drying liquids which do not flow thus freely.

To produce a solution which will be free from water during the application and drying of the film, non-hygroscopic liquids, solvents of pyroxyline or miscible with the solvents with which it is desired to employ them, must be used, not necessarily altogether, but at least in such proportion as practically to counteract under the conditions of use the affinity for moisture of any hygroscopic liquid or liquids present in the solution. It is evident that in a dry air less non-hygroscopic liquid will be required in the menstruum to prevent absorption of moisture than in a damp air, and also that the moisture-absorbing power of the hygroscopic ingredients is lessened by an increase of temperature. The end specially sought is to have the menstruum practically without moisture-absorbing or hygroscopic property in the air of a room at or slightly above atmospheric temperatures.

From what has been said it is evident that the liquids which are or may be used in carrying the present invention into effect must be neutral, volatile, and anhydrous, or practically so, and that such neutral, volatile, and anhydrous liquids are to be so used as to secure in the menstruum a certain solvent power in connection with a medium volatility and practical resistance to the absorption of moisture under the conditions of its use.

The following liquids have been found most suitable for use, namely: ethyl ether, acetone, methyl alcohol, (otherwise wood-spirit,) ethyl alcohol, (otherwise spirits of wine,) benzine, (otherwise petroleum-naphtha) and other light petroleum products, benzine, (otherwise coal-naphtha,) and other light products from the destructive distillation of coal or shale, propyl alcohol, butyl alcohol, amyl acetate, amyl alcohol, recently-distilled highly-rectified spirits of turpentine, nitro-benzine, (otherwise oil of mirbane,) oil of cedar, and oil of camphor; but there are of course other liquids which may be used. These liquids are generally miscible with each other, except in the case of benzine (petroleum-naphtha) and methyl alcohol, which are not directly miscible; but their admixture can be secured by the introduction of a suitable proportion of amyl alcohol or amyl acetate, and also in the case of benzine (petroleum-naphtha) and ethyl alcohol, which is not absolute, but of, say, ninety-five per cent., the same remedy being available in that case as in the former—namely, the introduction of amyl alcohol or amyl acetate.

Camphor and other solid bodies may be dissolved in the menstruum to increase its solvent action; but their use is unnecessary and they should not be used of such a nature and in such quantity as to injure the film. Camphor, for example, can be used to the extent of one and a half to two ounces to each gallon of menstruum.

The following formula is an excellent example of a suitable solution: amyl acetate, four (4) gallons; benzine (petroleum-naphtha) of, say, 62° Baumé gravity, four (4) gallons; methyl alcohol, two (2) gallons; pyroxyline, (say dry soluble nitro-cotton,) two and a half (2½) pounds. In this formula the solvent liquids amyl acetate and methyl alcohol form six-tenths, the non-hygroscopic liquids (benzine and amyl acetate) constitute eight-tenths, and the low-volatile amyl acetate is not in sufficient proportion to produce the undesirable effects of slow-drying solutions, but in connection with the more volatile benzine and methyl alcohol gives a menstruum of medium volatility. In it the hygroscopic property of the methyl alcohol is counteracted by the non-hygroscopic liquids. The presence of the amyl acetate causes the benzine to mix readily with the methyl alcohol.

Another good and very similar formula is: amyl acetate, four (4) gallons; benzine, (coal-naphtha,) four (4) gallons; acetone, two (2) gallons; pyroxyline, two and a half (2½) pounds. The different ingredients are mixed and the pyroxyline dissolved therein.

The metal article, having its surface polished and made free from water and grease by any ordinary or suitable means, is or may be dipped into a solution made according to either of the formulæ and on removal therefrom suspended in a chamber out of the draft till the adhering coat or film dries or hardens, which takes place in about fifteen or twenty minutes. The drying may be hastened by artificial heat, and while the use of such heat at any stage of the process is not inconsistent with the invention, yet it is preferred to operate in the cold—that is, at ordinary temperatures. In damp weather the coating should be dried at a temperature of, say, 100° to 105° Fahrenheit. The varnish or solution may also be applied by brushing.

The coated articles when the coatings are dry have their metal surfaces provided with a substantial, even, hard, thin, smooth, impervious, and transparent film of pyroxyline of sufficient tenacity, adhesion, and durability practically to resist the handling and exposure to which lacquered articles in general are subjected. If the varnishes are to be used on other materials than metal, they may of course be modified according to the nature of the material.

The term "naphtha" as hereinafter employed includes benzine, benzene and other light hydrocarbons of similar origin.

The term "light solvent specified" as hereinafter employed in claims 2 and 4 is intended to include acetone and methyl alcohol, (either or both,) they being substitutes for each other in the subject-matter claimed.

The term "described equivalent menstruum" as hereinafter employed in claim 2 is intended to include any menstruum which as a whole is substantially similar to the formulas given above, such menstruum being neutral, solvent of pyroxyline, anhydrous, non-hygroscopic, and of medium volatility.

In describing the invention one particular mode has been set forth with considerable minuteness; but it will be understood that this is by way of example and not as restricting the invention to the details given.

Amyl acetate is the only ethereal solvent mentioned having a low volatility; but other of the heavier volatile ethers are suitable for use.

In a divisional application, Serial No. 414,543, filed December 10, 1891, claim is made to that special discovery of the said RICHARD HALE which involves the admixture of methyl-alcohol and petroleum-naphtha by the aid of amyl alcohol or amyl acetate in the manufacture of thin solutions of pyroxyline. A menstruum composed of or containing methyl-alcohol mixed with petroleum-naphtha by the aid of amyl acetate or amyl alcohol, as well as other appropriate menstrua, may be usefully employed, as hereinbefore explained, in carrying out the subject-matter of the present specification, and such use would of course be within the claims hereof.

I therefore claim as the invention or discovery of the said RICHARD HALE—

1. As a new manufacture, articles having a metal surface, especially a polished metal surface, coated with a substantial, even, hard, thin, smooth, impervious, and transparent film of pyroxyline of sufficient tenacity, adhesion, and durability practically to resist the handling and exposure to which lacquered articles in general are subjected, substantially as described.

2. A thin solution of pyroxyline in a menstruum of amyl acetate, naphtha, and light solvent specified, or in a described equivalent menstruum, substantially as set forth.

3. A thin neutral solution of pyroxyline in an anhydrous menstruum, non-hygroscopic and of medium volatility, which contains naphtha as a substantial ingredient, substantially as described.

4. A thin neutral solution of pyroxyline in an anhydrous non-hygroscopic menstruum of medium volatility composed of a mixture of liquids having different degrees of volatility, to wit, of amyl acetate, which is of low volatility, in admixture with the more volatile naphtha and light solvent specified, substantially as described.

In testimony whereof I have signed this specification in the presence of two witnesses.

JULIA HALE,
*Ex. of Richard Hale.*

Witnesses:
HARRY L. CHUGH,
A. A. WOOLSON.